United States Patent [19]

Planche et al.

[11] Patent Number: 6,011,094

[45] Date of Patent: *Jan. 4, 2000

[54] PROCESS FOR THE PREPARATION OF BITUMEN-POLYMER COMPOSITIONS CONTAINING A CROSSLINKED ELASTOMER AND A FUNCTIONALIZED OLEFINIC POLYMER

[75] Inventors: Jean-Pascal Planche, Saint Just Chaleyssin; Claude Lacour, Vienne, both of France

[73] Assignee: Elf Aquitaine Production, Paris, La Defense, Cedex, France

[*] Notice: This patent issued on a continued prosecution application filed under 37 CFR 1.53(d), and is subject to the twenty year patent term provisions of 35 U.S.C. 154(a)(2).

[21] Appl. No.: 08/669,412

[22] PCT Filed: Nov. 8, 1995

[86] PCT No.: PCT/FR95/01471

§ 371 Date: Jul. 9, 1996

§ 102(e) Date: Jul. 9, 1996

[87] PCT Pub. No.: WO96/15193

PCT Pub. Date: May 23, 1996

[30] Foreign Application Priority Data

Nov. 10, 1994 [FR] France .................................... 94 13537

[51] Int. Cl.$^7$ ...................................................... C08L 95/00
[52] U.S. Cl. ................................................. 524/68; 524/69
[58] Field of Search ............................. 525/54.5; 524/68, 524/69, 59, 71

[56] References Cited

U.S. PATENT DOCUMENTS

| 4,567,222 | 1/1986 | Hagenbach | 524/476 |
|---|---|---|---|
| 5,266,615 | 11/1993 | Omeis | 524/69 |
| 5,331,028 | 7/1994 | Goodrich | 524/68 |

*Primary Examiner*—Christopher Henderson
*Attorney, Agent, or Firm*—Burgess, Ryan & Wayne

[57] ABSTRACT

Bitumen/polymer compositions having improved mechanical properties are produced by stirring together, at a temperature of 100–230° C., a bitumen or bitumen mixture, a sulphur-curable elastomer and a polymeric additive consisting of at least one functionalized olefin copolymer and a sulphur-donating coupling agent. The bitumen/polymer compositions may be used directly or in dilute form to make bituminous binders for road surfaces, coated materials and sealing coatings.

34 Claims, No Drawings

PROCESS FOR THE PREPARATION OF BITUMEN-POLYMER COMPOSITIONS CONTAINING A CROSSLINKED ELASTOMER AND A FUNCTIONALIZED OLEFINIC POLYMER

BACKGROUND OF THE INVENTION

1) Field of the Invention

The invention relates to a process for the preparation of bitumen/polymer compositions with improved mechanical properties. It further relates to the application of the compositions obtained to the production of pavements, and in particular of road surfacings, of bituminous mixes or else of watertight facings, and it also relates to a mother solution of polymers which can be employed for obtaining the said compositions.

2) Background Art

It is known to employ bituminous compositions as various surface coatings and especially as road surfacings, on condition that these compositions have a certain number of essential mechanical properties.

These mechanical properties are in practice assessed by determining, using standardized tests, a series of mechanical characteristics, the most widely employed of which are the following:

softening point, expressed in ° C. and determined by the ring-and-ball test defined by NF Standard T 66 008, brittleness point, or Fraass point, expressed in ° C. determined according to IP Standard 80/53, penetrability, expressed in 1/10 of a mm and determined according to NF Standard T 66 004, tensile rheological characteristics, determined according to NF Standard T 46 002, and comprising the quantities:

yield stress $\sigma y$, in bars,
yield elongation $\epsilon y$, in %,
breaking stress $\sigma b$, in bars,
elongation at break $\epsilon b$, in %.

An indication of the temperature susceptibility of the bituminous compositions can also be obtained from a correlation between the p en etrability (abbreviated to pen) and the softening point (abbreviated to RBT) of the said compositions, known by the name of Pfeiffer's number (abbreviated to PN).

This number is calculated using the relation:

$$PN=(20-500 A)/(1+50 A)$$

in which A is the slope of the straight line represented by the equation:

$$A=(\log_{10}800-\log_{10} pen)/(BRT-25)$$

The temperature susceptibility of the bituminous composition is proportionally lower the greater the value of Pfeiffer's number or, what amounts to the same thing, the lower the value of the quantity A. In the case of conventional bitumens, Pfeiffer's number assumes values which lie in the neighborhood of zero.

In general, conventional bitumens do not simultaneously exhibit the combination of the required properties and it has been known for a long time that the addition of various polymers to these conventional bitumens allows the mechanical properties of the latter to be favourably modified and bitumen-polymer compositions to be formed which have mechanical properties that are improved in relation to those of bitumens alone.

The polymers liable to be added to the bitumens are in most cases elastomers such as polyisoprene, butyl rubber, polybutene, polyisobutene, ethylene/vinyl acetate copolymers, polymethacrylate, polychloroprene, ethylene/propylene/diene (EPDM) torpolymer, polynorbornene or else random or block copolymers of styrene and of a conjugated diene.

Among the polymers which are added to bitumens, random or block copolymers of styrene and of a conjugated diene, and especially of styrene and butadiene or of styrene and isoprene, are particularly effective because they dissolve very easily in bitumens and endow them with excellent mechanical and dynamic properties and especially with very good viscoelasticity properties.

It is further known that the stability of the bitumen-polymer compositions can be improved by chemical coupling of the polymer to the bitumen, this improvement in addition making it possible to widen the field of use of the bitumen-polymer compositions.

Bitumen-polymer compositions in the case of which a random or block copolymer of styrene and of a conjugated diene, such as butadiene or isoprene, is coupled to the bitumen can be prepared by making use of the processes described in references FR-A-2376188, FR-A-2429241, FR-A-2528439 and EP-A-0360656. In these processes the said copolymer and a source of sulphur are incorporated into the bitumen, the operation being carried out between 130° C. and 230° C. and with stirring, and the mixture thus formed is then kept stirred and at a temperature between 130° C. and 230° C. for at least fifteen minutes. The source of sulphur consists of chemically unbonded sulphur (FR-A-2376188 and FR-A-2429241), of a polysulphide (FR-A-2528439) or of a sulphur-donor vulcanization accelerator employed by itself or in combination with chemically unbonded sulphur and/or a polysulphide or a vulcanization accelerator which is not a sulphur-donor (EP-A-0360656) and the incorporation of the copolymer and of the source of sulphur into the bitumen is carried out either by direct addition of the said ingredients to the bitumen (FR-A-2376188, FR-A-2528439 and EP-A-0360656) or else by first of all preparing a mother solution of the copolymer and of the source of sulphur in a hydrocarbon oil and then by adding the said mother solution to the bitumen (FR-A-2429241, FR-A-2528439 and EP-A-0360656).

SUMMARY OF THE INVENTION

It has now been found that it is possible further to improve substantially, among others, the consistency (increase in the ring-and-ball softening point), the temperature susceptibility (increase in Pfeiffer's number) and the tensile mechanical properties of the bitumen/polymer compositions in the case of which a sulphur-crosslinkable elastomer, in particular a block copolymer of styrene and of a conjugated diene such as butadiene or isoprene is coupled with the bitumen by the action of a sulphur-donor coupling agent, if a particular functionalized polyolefin is incorporated into the reaction mixture giving rise to these compositions.

The subject of the invention is therefore a process for the preparation of bitumen/polymer compositions with improved mechanical properties, the said process being of the type in which, a bitumen or mixture of bitumens is brought into contact with, calculated on the weight of the bitumen, between 0.3% and 20% and, preferably 0.5% to 10%, of a sulphur-crosslinkable elastomer and a sulphur-donor coupling agent in a quantity capable of providing a quantity of free sulphur representing 0.1% to 20% and preferably 0.5% to 10% of the weight of sulphur-crosslinkable polymer in the reaction mixture containing the bitumen, elastomer and coupling agent ingredients the operation being carried out at temperatures of between 100° C. and 230° C. and with stirring for a period of at least 10 minutes, and characterized in that, when the said contact is brought about, the reaction mixture also contains, by weight of the bitumen, 0.05% to 15%, and preferably 0.10% to 10%, of a polymer adjuvant consisting of one or several functionalized olefinic polymers chosen from copolymers containing, by weight, x % of units derived from ethylene or propylene, y % of units derived from one or more monomers A of formula

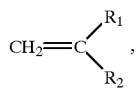

z % of units derived from at least one monomer B of formula

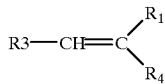

and v % of units derived from one or more monomers C differing from the monomers A and B, with, in these formulae, $R_1$ denoting H, $CH_3$ or $C_2H_5$, $R_2$ denoting a —$COOR_5$, —$OR_5$ or —$OOCR_6$ radical, with $R_5$ denoting a $C_1$–$C_{10}$ and preferably $C_1$–$C_6$ alkyl radical and $R_6$ denoting H or a $C_1$–$C_3$ alkyl radical, $R_3$ denoting H, COOH or $COOR_5$, $R_5$ having the abovementioned definition, and $R_4$ denoting a —COOH, —OH,

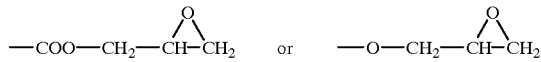

radical, and x, y, z and v being numbers such that $40 \leq x \leq 99.7$, $0 \leq y \leq 50$, $0 \leq z \leq 20$ and $0 \leq v \leq 15$ with $y+z \geq 0.3$ and $x+y+z+v=100$.

DESCRIPTION OF THE PREFERRED EMBODIMENTS

In the abovementioned copolymers, x, y, z and v are preferably such that $50 \leq x \leq 99.5$, $0 \leq y \leq 40$, $0 \leq z \leq 15$ and $0 \leq v \leq 10$ with $y+z \geq 0.5$ and $x+y+z+v=100$.

The monomers A of formula

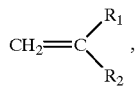

which provide the units

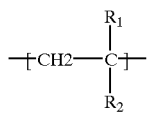

in the olefinic copolymer, are chosen in particular from vinyl formate, vinyl acetate, vinyl propionate, vinyl butyrate, vinyl ethers $CH_2=CH-O-R_5$ where $R_5$ is a $C_1-C_6$ and preferably $C_1-C_{10}$ alkyl radical such as methyl, ethyl, propyl or butyl, and alkyl acrylates and methacrylates of formula

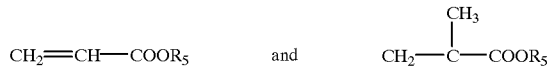

respectively, where $R_5$ has the meaning given above.

The monomers B of formula

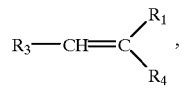

which provide units

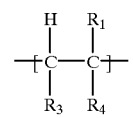

in the olefinic copolymer, are chosen in particular from maleic acid and its anhydride, acrylic acid, methacrylic acid, alkyl hydrogen maleates of formula HOOC—CH=CH—$COOR_7$ where $R_7$ is a $C_1-C_6$ alkyl radical such as methyl, ethyl, propyl or butyl, glycidyl acrylates and methacrylates of formula

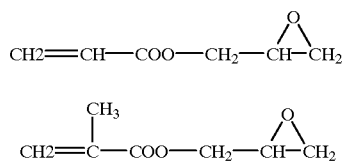

respectively, vinyl alcohol and vinyl glycidyl ether of formula

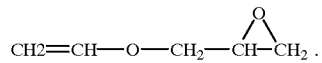

The monomers C, the presence of which in the olefinic copolymer is optional, are monomers which can be polymerized by a radical route, which differ from the monomers A and B, like, for example, CO, $S_2$ and acrylonitrile.

The olefinic copolymers capable of constituting the polymer adjuvant are advantageously chosen from:

(a) random copolymers of ethylene and of vinyl acetate and random copolymers of ethylene and of alkyl acrylate or methacrylate containing a $C_1-C_6$ alkyl residue, such as methyl, ethyl, propyl, butyl or hexyl, which contain, by weight, 40% to 99.7%, and preferably 50% to 99%, of ethylene;

(b) random copolymers of ethylene and of a monomer B chosen from acrylic acid, methacrylic acid, maleic acid or its anhydride, glycidyl acrylate and glycidyl methacrylate, which contain, by weight, 80% to 99.7%, and preferably 85% to 99.5%, of ethylene;

(c) random terpolymers of ethylene, of a monomer A chosen from vinyl acetate and alkyl acrylates or methacrylates containing a $C_1-C_6$ alkyl residue such as methyl, ethyl, propyl, butyl or hexyl, and of a monomer B chosen from acrylic acid, methacrylic acid, maleic acid or its anhydride, glycidyl acrylate and glycidyl methacrylate, which contain, by weight, 0.5% to 40% of units derived from the monomer A and 0.5% to 15% of units derived from the monomer B, the remainder being formed by units derived from ethylene; and (d) the copolymers resulting from the grafting of a monomer B chosen from acrylic acid, methacrylic acid, maleic acid or its anhydride, glycidyl acrylate and glycidyl methacrylate, onto a substrate consisting of a polymer chosen from polyethylenes, especially low density polyethylenes, polypropylenes and the random copolymers defined under (a), the said graft copolymers containing, by weight, 0.5% to 15% of grafted units originating from the monomer B.

Olefinic copolymers chosen from the following are particularly preferred for forming the polymer adjuvant:

(i) random terpolymers of ethylene, of alkyl acrylate or methacrylate containing a $C_1$–$C_6$ alkyl residue such as methyl, ethyl or butyl, and of maleic anhydride, which contain, by weight, 0.5% to 40% of units derived from alkyl acrylate or methacrylate and 0.5% to 15% of units derived from maleic anhydride, the remainder being formed by units derived from ethylene;

(ii) random terpolymers of ethylene, of alkyl acrylate or methacrylate containing a $C_1$–$C_6$ alkyl residue such as methyl, ethyl or butyl, and of glycidyl acrylate or methacrylate, which contain, by weight, 0.5% to 40% of units derived from alkyl acrylate or methacrylate and 0.5% to 15% of units derived from glycidyl acrylate or methacrylate, the remainder being formed by units derived from ethylene;

(iii) maleic anhydride-grafted low density polyethylenes and maleic anhydride-grafted poly-propylenes, which contain, by weight, 0.5% to 15% of grafted units derived from maleic anhydride.

According to the invention the polymer adjuvant may be formed by associating an olefinic copolymer of the abovementioned type, comprising units containing COOH or OH functional groups and an olefinic copolymer of the abovementioned type, comprising units containing glycidyl functional groups.

The olefinic copolymers employed for forming the polymer adjuvant advantageously have molecular masses such that the melt index of the said copolymers, determined according to ASTM Standard D 1238 (test carried out at 190° C. under a 2.16 kg load) has a value, expressed in g per 10 minutes, of between 0.3 and 3000 and preferably between 0.5 and 900.

The bitumen, or mixture of bitumens, which is employed in the preparation of the bitumen/polymer compositions is advantageously chosen from the various bitumens which have a kinematic viscosity at 100° C. of between $0.5 \times 10^{-4}$ $m^2/s$ and $3 \times 10^{-2}$ $m^2/s$ and preferably between $1 \times 10^{-4}$ $m^2/s$ and $2 \times 10^{-2}$ $m^2/s$. These bitumens may be direct distillation or vacuum distillation bitumens or else oxidized or semi-oxidized bitumens, or even some petroleum cuts or mixtures of bitumens and of vacuum distillates. Besides a kinematic viscosity included within the abovementioned ranges, the bitumen or mixture of bitumens employed to obtain the compositions according to the invention advantageously has a penetrability at 25° C., defined according to NF Standard T 66004, of between 5 and 800 and preferably between 10 and 400.

The sulphur-crosslinkable elastomer which is employed to prepare the bitumen/polymer compositions and which is encountered again crosslinked in the said compositions, may be such as polyisoprene, polynorbornene, polybutadiene, butyl rubber or ethylene/propylene/diene (EPDM) terpolymer. The said elastomer is advantageously chosen from random or block copolymers of styrene and of a conjugated diene such as butadiene, isoprene, chloroprene, carboxylated butadiene and carboxylated isoprene, and more particularly consists of one or more copolymers chosen from block copolymers, with or without a random hinge, of styrene and butadiene, of styrene and isoprene, of styrene and chloroprene, of styrene and carboxylated butadiene or alternatively of styrene and carboxylated isoprene. The copolymer of styrene and of a conjugated diene, and in particular each of the abovementioned copolymers, advantageously has a styrene weight content ranging from 5% to 50%. The weight-average molecular mass of the copolymer of styrene and of conjugated diene, and especially that of the abovementioned copolymers, may be, for example, between 10 000 and 600 000 daltons and is preferably between 30 000 and 400 000 daltons. The copolymer of styrene and of conjugated diene is preferably chosen from di- or triblock copolymers of styrene and butadiene, of styrene and isoprene, of styrene and carboxylated butadiene or alternatively of styrene and carboxylated isoprene which have styrene contents and weight-average molecular masses that lie within the ranges defined above.

The sulphur-donor coupling agent which is employed in the preparation of the bitumen/polymer compositions according to the invention may consist of a product chosen from the group made up of elemental sulphur, hydrocarbyl polysulphides, sulphur-donor vulcanization accelerators, mixtures of such products with each other and/or with vulcanizing agents which are not sulphur-donors. In particular, the sulphur-donor coupling agent is chosen from the products M which contain, by weight, from 0 to 100% of a component CA consisting of one or more sulphur-donor vulcanization accelerators and from 100% to 0% of a component CB consisting of one or more vulcanizing agents chosen from elemental sulphur and hydrocarbyl polysulphidest and the products N which contain a component CC consisting of one or more vulcanization accelerators which are not sulphur-donors and a product M, in a weight ratio of the component CC to the product M, ranging from 0.01 to 1 and preferably from 0.05 to 0.5.

The elemental sulphur capable of being employed for constituting, partially or entirely, the coupling agent is advantageously sulphur in flower form and preferably sulphur crystallized in the orthorhombic form and known by the name of alpha sulphur.

The hydrocarbyl polysulphides capable of being employed to form a proportion or all of the coupling agent may be chosen from those defined in reference FR-A-2528439 and corresponding to the general formula $R_8$—$(S)_m$—$(R_9$—$(S)_m)_w$—$R_{10}$, in which each of $R_8$ and $R_{10}$ denotes a $C_1$–$C_{20}$, saturated or unsaturated, monovalent hydrocarbon radical, or both are joined together to form a saturated or unsaturated, $C_1$–$C_{20}$ divalent hydrocarbon radical forming a ring with the other groups of atoms associated in the formula, R. is a $C_1$–$C_{20}$, saturated or unsaturated, divalent hydrocarbon radical, the —(S)m— groups denote divalent groups, each made up of m sulphur atoms, it being possible for the values m to differ from one of the said groups to another and to denote integers ranging from 1 to 6 with at least one of the values of m equal to or greater than 2 and w denotes an integer assuming values from zero to 10. Preferred polysulphides correspond to the formula $R_{11}$—$(S)_p$—$R_{11}$, in which $R_{11}$ denotes a C6–C16 alkyl radical, for example hexyl, octyl, dodecyl, tert-dodecyl, hexadecyl, nonyl or decyl, and —(S)p— denotes a divalent group made up of a chain sequence of p sulphur atoms, p being an integer ranging from 2 to 5.

When the coupling agent contains a sulphur-donor vulcanization accelerator, the latter may be chosen in particular from the thiuram polysulphides of formula

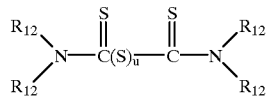

in which each of the symbols $R_{12}$, which are identical or different, denotes a $C_1$–$C_{12}$ and preferably $C_1$–$C_8$ hydrocarbon radical, especially an alkyl, cycloalkyl or aryl radical, or else two $R_{12}$ radicals attached to the same nitrogen atom are bonded together to form a $C_2$–$C_8$ hydrocarbon divalent radical and u is a number ranging from 2 to 8. As examples of such vulcanization accelerators, there may be mentioned especially the compounds: dipentamethylenethiuram disulphide, dipentamethylenethiuram tetrasulphide, dipentamethylenethiuram hexasulphide, tetrabutylthiuram disulphide, tetraethylthiuram disulphide and tetramethylthiuram disulphide.

As other examples of sulphur-donor vulcanization accelerators there may also be mentioned alkylphenol disulphides and disulphides such as morpholine disulphide and N,N'-caprolactam disulphide.

Vulcanization accelerators which are not sulphur-donors and which can be employed for forming the component CC of the coupling agents of the product N type may be sulphur compounds chosen especially from mercaptobenzothiazole and its derivatives, especially benzothiazole metal thiolates and above all benzothiazolesulphenamides, dithiocarbamates of formula

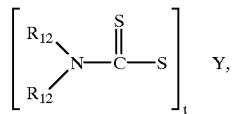

in which the symbols $R_{12}$, which are identical or different, have the meaning given above, Y denotes a metal and t denotes the valency of Y, and thiuram monosulphides of formula

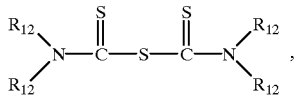

in which the symbols $R_{12}$ have the meaning given above.

Examples of vulcanization accelerators of the mercaptobenzothiazole type may be such as mercaptobenzothiazole, benzothiazole thiolate of a metal such as zinc, sodium or copper, benzothiazyl disulphide, 2-benzothiazolepentamethylenesulphenamide, 2-benzothiazolethiosulphenamide, 2-benzothiazoledihydrocarbylsulphenamides in the case of which the hydrocarbyl radical is an ethyl, isopropyl, tert-butyl or cyclohexyl radical, and N-oxydiethylene-2-benzothiazolesulphenamide.

Among the vulcanization accelerators of the dithiocarbamate type of the abovementioned formula there may be mentioned the compounds which are dimethyldithiocarbamates of metals such as copper, zinc, lead, bismuth and selenium, diethyldithiocarbamates of metals such as cadmium and zinc, diamyldithiocarbamates of metals such as cadmium, zinc and lead, and lead or zinc pentamethylenedithiocarbamate.

By way of examples of thiuram monosulphides which have the formula given above there may be mentioned compounds such as dipentamethylenethiuram monosulphide, tetramethylthiuram monosulphide, tetraethylthiuram monosulphide and tetrabutylthiuram monosulphide.

Other vulcanization accelerators which are not sulphur-donors and which do not belong to the classes defined above may also be employed. Such vulcanization accelerators may be such as 1,3-diphenylguanidine, di-ortho-tolylguanidine and zinc oxide, the latter compound being employed optionally in the presence of fatty acid.

For further details on the sulphur-donor vulcanization accelerators and those which are not sulphur donors that can be employed in the constitution of the coupling agent, reference may be made to citations EP-A-0360656 and EP-A-0409683, the content of which is incorporated in the present description by reference, as is the content of citation FR-A-2528439.

As follows from its composition, as indicated above, the coupling agent may be of single-component or of the multicomponent type, it being possible for the coupling agent of the multicomponent type to be formed before it is employed or alternatively produced in situ in the mixture in which it must be present. The coupling agent of the preformed multicomponent type or of the single-component type or the components of the coupling agent of the multicomponent type formed in situ may be used as they are, for example in the molten state, or else as a mixture, for example in solution or in suspension, with a diluent, for example a hydrocarbon compound.

The reaction mixture giving rise to the bitumen/polymer compositions may be formed by first of all producing a mixture containing the bitumen or mixture of bitumens and the sulphur-crosslinkable elastomer and then by incorporating the coupling agent and, simultaneously or subsequently, the polymer adjuvant into this mixture. However, according to a preferred embodiment, the reaction mixture giving rise to the bitumen/polymer compositions is formed by producing a mixture containing the bitumen or mixture of bitumens, the sulphur-crosslinkable elastomer and the polymer adjuvant and then by incorporating the sulphur-donor coupling agent into the mixture obtained.

This preferred embodiment is advantageously used by first of all bringing the sulphur-crosslinkable elastomer and the polymer adjuvant into contact with the bitumen or mixture of bitumens, using proportions of elastomer and of polymer adjuvant which have values, in relation to the bitumen, that are chosen within the ranges defined above for these proportions, the operation being carried out at temperatures of between 100° C. and 230° C., more particularly between 120° C. and 190° C., and with stirring, for a sufficient period, generally of the order of a few tens of minutes to several hours and, for example, of the order of 30 minutes to 8 hours, to form a homogeneous mixture and then by incorporating the sulphur-donor coupling agent into the said mixture in an appropriate quantity chosen from the ranges defined above for the said quantity, and while the whole is kept stirred at temperatures of between 100° C. and 230° C., more particularly between 120° C. and 190° C., which are or are not identical with the temperatures for mixing the sulphur-crosslinkable elastomer and the polymer adjuvant with the bitumen or mixture of bitumens, for a period of at least 10 minutes and generally ranging from 10 minutes to 5 hours, more particularly from 30 minutes to 180 minutes, to form a reaction product constituting the bitumen/polymer composition.

In the preferred implementation given above, the polymer adjuvant may be incorporated into the bitumen or mixture of bitumens before or after the sulphur-crosslinkable elastomer, it being also possible for a simultaneous incorporation to be envisaged.

The reaction mixture based on bitumen or mixture of bitumens, sulphur-crosslinkable elastomer, polymer adjuvant and sulphur-donor coupling agent, which gives rise to the bitumen/polymer compositions, may also contain one or more additives capable of reacting with the functional groups of the copolymer or of the copolymers constituting the polymer adjuvant. These reactive additives may be, in particular, primary or secondary amines, especially polyamines, alcohols, especially polyols, acids, especially polyacids, or else metal salts.

Reactive additives of the amine type are, for example, aromatic diamines such as 1,4-diaminobenzene, 2,4-diaminotoluene, diaminonaphthalene, bis(4-aminophenyl) sulphone, bis(4-aminophenyl) ether, bis(4-aminophenyl) methane, aliphatic or cycloaliphatic diamines such as those of formula $H_2N-R_{13}-NH_2$ where $R_{13}$ denotes a $C_2-C_{12}$ alkylene or $C_6-C_{12}$ cycloalkylene radical, for example ethylenediamine, diaminopropane, diaminobutane, diaminohexane, diaminooctane, diaminodecane, diaminododecane, diaminocyclohexane, diaminocyclooctane, diaminocyclododecane, polyethylenepolyamines or polypropylenepolyamines such as diethylenetriamine, triethylenetetramine, tetraethylenepentamine or dipropylenetriamine or else fatty amines or polyamines, that is to say amines or polyamines containing a $C_{12}-C_{18}$ alkyl or alkenyl radical bonded to the nitrogen atom of an amine group.

Reactive additives of the alcohol type are, in particular, polyols such as diols or triols and especially diols of formula $HO-R_{14}-OH$, where $R_{14}$ denotes a hydrocarbon radical, especially a $C_2-C_{18}$ alkylene, $C_6-C_8$ arylene and $C_6-C_8$ cycloalkylene radical, and polyetherdiols of formula $HO[C_qH_{2q}O]_rH$ where q is a number ranging from 2 to 6 and especially equal to 2 or 3 and r is a number at least equal to 2 and ranging, for example, from 2 to 20. Examples of such polyols are such as ethylene glycol, propylene glycol, butylene glycol, diethylene glycol, triethylene glycol, tetraethylene glycol, hexanediol, octanediol and polyhydroxylated polybutadiene.

Reactive additives of the acid type are, in particular, polyacids of formula $HOOC-R_{14}-COOH$, where $R_{14}$ has the meaning given above. Examples of such polyacids are phthalic acid, terephthalic acid, malonic acid, succinic acid, adipic acid, glutaric acid and poly-carboxylated polybutadiene.

Reactive additives of the metal salt type are, in particular, compounds such as hydroxides, oxides, alcoholates, carboxylates like formates and acetates, methoxides, ethoxides, nitrites, carbonates and bicarbonates of metals of groups I, II, III and VIII of the Periodic Table of the elements, especially Na, K, Li, Mg, Ca, Cd, Zn, Ba, Al and Fe.

The quantity of the reactive additive or of the reactive additives which is incorporated into the reaction mixture giving rise to the bitumen/polymer compositions may range from 0.01% to 10% and, more particularly, from 0.05% to 5% of the weight of bitumen present in the said reaction mixture.

The reaction mixture giving rise to the bitumen/polymer compositions may further have added to it from 1% to 40%, and more particularly from 2% to 30%, by weight of the bitumen, of a fluxing agent which may consist, in particular, of a hydrocarbon oil which has an atmospheric pressure distillation range, determined according to ASTM Standard D 86–67, of between 100° C. and 600° C. and lying more especially between 150° C. and 400° C. This hydrocarbon oil, which may be especially a petroleum cut of aromatic nature, a petroleum cut of naphthenoaromatic nature, a petroleum cut of naphtheno-paraffinic nature, a petroleum cut of paraffinic nature, a coal oil or else an oil of vegetable origin, is sufficiently "heavy" to limit the evaporation at the time of its addition to the bitumen and, at the same time, sufficiently "light" to be removed as much as possible after the bitumen-polymer composition containing it has been spread, so as to regain the same mechanical properties which the bitumen/polymer composition prepared without employing any fluxing agent would have exhibited after hot spreading. The fluxing agent may be added to the reaction mixture at any time of the constitution of the said mixture, the quantity of fluxing agent being chosen within the ranges defined above, in order to be compatible with the desired final use on the work site.

Besides the reactive additives and the fluxing agent, it is also possible to incorporate into the reaction mixture giving rise to the bitumen/polymer compositions, at any time of the constitution of the said reaction mixture, additives which are conventionally employed in bitumen/polymer compositions, such as promoters of adhesion of the bitumen/polymer composition to the mineral surfaces or else fillers such as talc, carbon black or worn tyres reduced to small powder.

In one form of implementation of the process according to the invention, employing a hydrocarbon oil as defined above as fluxing agent, the sulphur-crosslinkable elastomer, the polymer adjuvant and the coupling agent are incorporated into the bitumen in the form of a mother solution of these products in the hydrocarbon oil constituting the fluxing agent.

The mother solution is prepared by bringing into contact the ingredients of which it is composed, namely hydrocarbon oil used as solvent, sulphur-crosslinkable elastomer, polymer adjuvant and coupling agent, with stirring, at temperatures between 10° C. and 170° C. and more particularly between 40° C. and 120° C., for a sufficient period, for example of approximately 30 minutes to approximately 90 minutes, to obtain complete dissolution of the sulphur-crosslinkable elastomer, of the polymer adjuvant and of the coupling agent in the hydrocarbon oil.

The respective concentrations of the sulphur-crosslinkable elastomer, of the polymer adjuvant and of the coupling agent in the mother solution may vary quite widely, especially as a function of the nature of the hydrocarbon oil employed for dissolving the sulphur-crosslinkable elastomer, the polymer adjuvant and the coupling agent. Thus, the respective quantities of sulphur-crosslinkable elastomer, of polymer adjuvant and of coupling agent may advantageously represent 5% to 30%, 1% to 20% and 0.005% to 6% of the weight of the hydrocarbon oil.

To prepare the bitumen/polymer compositions in accordance with the invention by making use of the mother solution technique, the mother solution containing the sulphur-crosslinkable elastomer, the polymer adjuvant and the coupling agent is mixed with the bitumen or mixture of bitumens, the operation being carried out at temperatures of between 100° C. and 230° C., more particularly between 120° C. and 190° C., and with stirring, this being done, for example, by incorporating the mother solution into the bitumen kept stirred at temperatures of between 100° C. and 230° C. and more particularly between 120° C. and 190° C., and the resulting mixture is then kept stirred at temperatures of between 100° C. and 230° C., more particularly between 120° C. and 190° C., for example at the temperatures employed for producing the mixture of the mother solution with the bitumen, for a period of at least 10 minutes and generally ranging from 10 minutes, to 90 minutes, to form a reaction product constituting the bitumen/polymer composition.

The quantity of mother solution which is mixed with the bitumen is chosen to yield the desired quantities, relative to the bitumen, of sulphur-crosslinkable elastomer, of polymer adjuvant and of coupling agent, the said quantities being within the ranges defined above.

The bitumen/polymer compositions obtained by the process according to the invention may be employed as they are or else diluted with variable proportions of a bitumen or mixture of bitumens or of a composition according to the invention which has different characteristics, in order to constitute bitumen/polymer binders which have chosen contents of crosslinked elastomer and polymer adjuvant respectively. These contents may be either equal to (undiluted compositions) or lower than (diluted compositions) the respective contents of crosslinked elastomer and of polymer adjuvant of the corresponding initial bitumen/polymer compositions. The dilution of the bitumen/polymer compositions according to the invention with the bitumen or mixture of bitumens or with a composition according to the invention of different characteristics may be carried out either directly following the preparation of the said compositions, when a virtually immediate use of the resulting bitumen/polymer binders is required, or else alternatively after a more or less extended period of storage of the bitumen/polymer compositions, when a delayed use of the resulting bitumen/polymer binders is envisaged. The bitumen or mixture of bitumens employed for the dilution of a bitumen/polymer composition according to the invention may be chosen from the bitumens defined above as being suitable for the preparation of the bitumen/polymer compositions.

The dilution of a bitumen/polymer composition according to the invention with a bitumen or mixture of bitumens or with a second composition according to the invention with lower contents of crosslinked elastomer and polymer adjuvant, in order to form a bitumen/polymer binder with chosen contents of crosslinked elastomer and of polymer adjuvant which are lower than those of the bitumen/polymer composition to be diluted is generally carried out by bringing into contact, with stirring and at temperatures of between 100° C. and 230° C. and more particularly between 120° C. and 190° C., suitable proportions of the bitumen/polymer composition to be diluted and of bitumen or mixture of bitumens or of second bitumen/polymer composition according to the invention.

The bitumen/polymer binders consisting of the bitumen/polymer compositions according to the invention or resulting from the dilution of the said compositions with a bitumen or mixture of bitumens or with another bitumen/polymer composition according to the invention, as far as the desired contents of crosslinked elastomer and of polymer adjuvant, respectively, in the said binders, can be applied, directly or after conversion into aqueous emulsion, to the production of road surfacing of the surface coating type, for the production of bituminous mixes which are put in place with heating or cold, or else to the production of waterproof facings.

The invention is illustrated by the following examples, given without any limitation being implied.

In these examples the quantities and percentages are expressed by weight, except where indicated otherwise.

In addition, the Theological and mechanical characteristics of the bitumens or of the bitumen/polymer compositions to which reference is made in the said examples, namely penetrability, ring-and-ball softening point, Pfeiffer's number and tensile rheological characteristics, are those defined above.

EXAMPLES 1 to 8

Control bitumen/polymer compositions (Examples 1, 2, 5 and 7) and bitumen/polymer compositions according to the invention (Examples 3, 4, 6 and 8) were prepared in order to evaluate and compare their physicomechanical characteristics.

The operation was carried out in the following conditions:

Example 1 (control): Preparation of a bitumen/polymer composition containing a sulphur-crosslinked elastomer and free from polymer adjuvant.

Into a reactor maintained at 175° C. and with stirring were introduced 974.2 parts of a bitumen which had a penetrability at 25° C., determined according to the methods of NF Standard T 66004, equal to 68 and 25 parts of a block copolymer of styrene and butadiene which had a weight-average molecular mass equal to 100 000 daltons and containing 25% of styrene. After 2.5 hours' mixing with stirring at 175° C. a homogeneous mass was obtained. 0.8 parts of crystallized sulphur were then added to the abovementioned homogeneous mass, maintained at 175° C., and the whole was stirred again at the said temperature for 3 hours to form a crosslinked bitumen/polymer control composition.

Example 2 (control): Preparation of a bitumen/polymer composition containing a polymer adjuvant and free from sulphur-crosslinked elastomer. Into a reactor maintained at 175° C. were introduced, with stirring, 975 parts of the bitumen employed in Example 1 and 25 parts of a polymer adjuvant consisting of an ethylene/ethyl acrylate/glycidyl methacrylate terpolymer containing 24% of ethyl acrylate and 8% of glycidyl methacrylate and possessing a melt index, determined according to ASTM Standard D 1238, which had a value of 6 g per 10 minutes. After 3 hours' mixing with stirring at 175° C. a homogeneous mass was obtained, constituting an uncrosslinked bitumen/polymer control composition.

Example 3 (according to the invention): Preparation of a bitumen/polymer composition containing a sulphur-crosslinked elastomer and a polymer adjuvant. Into a reactor maintained at 175° C. were introduced, with stirring, 974.5 parts of the bitumen employed in Example 1 and 17.5 parts of the block copolymer of styrene and butadiene employed in the said Example 1, and then, 15 minutes later, 7.5 parts of the ethylene/ethyl acrylate/glycidyl methacrylate employed in Example 2 were added to the content of the reactor. After 2.5 hours' mixing with stirring at 175° C. a homogeneous mass was obtained. 0.5 parts of crystallized sulphur were then added to the abovementioned homogeneous mass, maintained at 175° C., and the whole was stirred again at the said temperature for 3 hours to form a bitumen/polymer composition according to the invention.

Example 4 (according to the invention): Preparation of a bitumen/polymer composition containing a sulphur-crosslinked elastomer, a polymer adjuvant and a reactive additive of the polyamine type.

The operation was carried out as described in Example 3, but using only 973.5 parts of bitumen and, in addition, by incorporating into the reaction mixture, after addition of the terpolymer and before the addition of sulphur, 1 part of a fatty polyamine, namely N-tallow-3-amino-1-propyl-1,4,5,6-tetrahydropyrimidine, marketed by the company CECA under the name Polyram L200®.

Pfeiffer's number (PN), tensile Theological characteristics, namely:
  breaking stress (σb),
  elongation at break (εb).

The results obtained are collected in the following table.

| Example | O* | 1 | 2 | 3 | 4 | 5 | 6 | 7 | 8 |
|---|---|---|---|---|---|---|---|---|---|
| PFO | | | GMA | GMA | GMA | | GMA | EVA | EVA |
| % PFO | | | 2.5 | 0.75 | 0.75 | | 1 | 5 | 1.5 |
| % Elastomer | | 2.50 | | 1.75 | 1.75 | 5 | 3.50 | | 3.50 |
| % Sulphur | | 0.08 | | 0.05 | 0.05 | 0.15 | 0.15 | | 0.15 |
| % Amine | | | | | 0.10 | | | | |
| % Bitumen | 100 | 97.42 | 97.5 | 97.45 | 97.35 | 94.85 | 95.35 | 95 | 94.85 |
| Pen 25 (0.1 mm) | 68 | 59.5 | 63.5 | 60.5 | 71 | 50 | 56 | 45** | 51 |
| RBT (° C.) | 49 | 54.1 | gel | 57.3 | 57 | 66 | 73 | 64 | 70 |
| PN | −0.71 | 0.21 | n.c. | 0.97 | 1.35 | 2.15 | 3.62 | 1.53 | 2.88 |
| Tensile at 20° C. | | | | | | | | | |
| σb (daN/cm$^2$) | 0.0 | 0.63 | 0.40 | 0.95 | 1.05 | 1.30 | 1.80 | 0.80 | 1.60 |
| εb (%) | >700 | >700 | >700 | >700 | >700 | >700 | >700 | 500 | >700 |
| Tensile at 5° C. | | | | | | | | | |
| σb (daN/cm$^2$) | | 5.6 | 3.7 | 6.2 | 6.2 | 8.7 | 9.2 | 4.5 | 9.0 |
| εb (%) | | >700 | >350 | >700 | >700 | >700 | >700 | >180 | >700 |

O*: Starting bitumen.
PFO: Polymer adjuvant.
Elastomer: styrene/butadiene block copolymer.
EVA: Ethylene/vinyl acetate copolymer.
GMA: Ethylene/ethyl acrylate/glycidyl methacrylate terpolymer.
**Demixing is noted after the composition has been maintained at 180° C. for 3 days.
n.c.: Not calculable.

Example 5 (control): Preparation of a bitumen/polymer composition containing a sulphur-crosslinked elastomer and free from polymer adjuvant. The operation was carried out as described in Example 1, but using 948.5 parts of bitumen, 50 parts of styrene/butadiene block copolymer and 1.5 parts of crystallized sulphur.

Example 6 (according to the invention): Preparation of a bitumen/polymer composition containing a sulphur-crosulinked elastomer and a polymer adjuvant. The operation was carried out as described in Example 3, but using 953.5 parts of bitumen, 35 parts of styrene/butadiene block copolymer, 10 parts of ethylene/ethyl acrylate/glycidyl methacrylate terpolymer and 1.5 parts of crystallized sulphur.

Example 7 (control): Preparation of a bitumen/polymer composition containing a polymer adjuvant and free from sulphur-crosslinked elastomer. The operation was carried out as described in Example 2, but using 950 parts of bitumen and replacing the terpolymer with 50 parts of an ethylene/vinyl acetate copolymer containing 18% of vinyl acetate and possessing a melt index, determined according to ASTM Standard D 1238, which had a value of 150 g per 10 minutes.

Example 8 (according to the invention): Preparation of a bitumen/polymer composition containing a sulphur-crosslinked elastomer and a polymer adjuvant. The operation was carried out as described in Example 6, but replacing the ethylene/ethyl acrylate/glycidyl methacrylate terpolymer with 15 parts of the ethylene/vinyl acetate copolymer employed in Example 7. The following characteristics were determined for each of the bitumen/polymer compositions obtained as shown in Examples 1 to 8, and for the starting bitumen:

penetrability at 25° C. (Pen. 25),
ring-and-ball softening point (RBT),

In the light of the results collected in the table it may be noted that:

the association of the polymer adjuvant (ethylene/ethyl acrylate/glycidyl methacrylate terpolymer or ethylene/vinyl acetate copolymer) and of the elastomer (styrene/butadiene block copolymer) in the sulphur-crosslinked bitumen/polymer compositions (bitumen/polymer compositions according to the invention) provides a synergy effect, which means that the mechanical properties (RBT, PN, ab and eb) of the bitumen/polymer compositions according to the invention are superior, at identical or lower overall contents of elastomer and polymer adjuvant, than the corresponding mechanical properties of the control bitumen/polymer compositions (cf. Example 3 according to the invention, compared with the control Examples 1 and 2; Example 6 according to the invention compared with control Example 5; Example 8 according to the invention, compared with control Example 7), in the absence of sulphur-crosslinked styrene/butadiene block copolymer in the bitumen/polymer composition and at a content of a few per cent of ethylene/ethyl acrylate/glycidyl methacrylate terpolymer in the said composition, this bitumen/polymer composition is in the form of a gel which cannot be handled (cf. control Example 2), in the absence of sulphur-crosslinked styrene/butadiene block copolymer in the bitumen/polymer composition and at higher content of ethylene/vinyl acetate copolymer in the said composition, this bitumen/polymer composition is unstable in storage at 180° C. (demixing of the composition after maintaining at 180° C. for 3 days), the addition of polyamine reinforces the properties and especially Pfeiffer's number.

We claim:

1. The process for the preparation of bitumen/polymer compositions with improved mechanical properties in which a bitumen or mixture of bitumens is brought into contact with, calculated on the weight of the bitumen, between 0.3% and 20% of a sulphur-crosslinkable elastomer and a sulphur-donor coupling agent in a quantity capable of providing a quantity of free sulphur representing 0.1% to 20% of the weight of sulphur crosslinkable polymer in the reaction mixture containing the bitumen, elastomer and coupling agent ingredients, the operation being carried out at temperatures of between 100° C. and 230° C. and with stirring for a period of at least 10 minutes, the reaction mixture also containing, when the said contact is brought about, 0.05% to 15% by weight of the bitumen, of a polymer adjuvant consisting of at least one functionalized olefinic polymer selected from the group consisting of:

(a) random copolymers of ethylene and of vinyl acetate and random copolymers of ethylene and of alkyl acrylate or methacrylate containing a $C_1$ to $C_6$ alkyl residue, which contain, by weight, 40% to 99.7% of ethylene;

(b) random copolymers of ethylene and of a monomer selected from the group consisting of acrylic acid, methacrylic acid, maleic acid and its anhydride, glycidyl acrylate and glycidyl methacrylate, which contain, by weight, 80% to 99.7% of ethylene;

(c) random terpolymers of ethylene, of a monomer A selected from the group consisting of vinyl acetate and alkyl acrylates or methacrylates containing a $C_1$ to $C_6$ alkyl residue and of a monomer B selected from the group consisting of acrylic acid, methacrylic acid, maleic acid and its anhydride, glycidyl acrylate and glycidyl methacrylate, which contain, by weight 0.5% to 40% of units derived from the monomer A and 0.5% to 15% of units derived from the monomer B, the remainder being formed by units derived from ethylene; and (d) the copolymers resulting from the grafting of a monomer B selected from the group consisting of acrylic acid, methacrylic acid, maleic acid and its anhydride, glycidyl acrylate and glycidyl methacrylate, onto a substrate consisting of a polymer selected from the group consisting of polyethylenes, polypropylenes and a random copolymer defined under (a), said graft copolymers containing by weight 0.5% to 15% of grafted units originating from the monomer B.

2. The process according to claim 1 wherein in paragraph (a) the random copolymers contain by weight, 50% to 99% ethylene and in paragraph (b) the random copolymer contain 85% to 99.5% ethylene.

3. The process according to claim 1 wherein the polymer adjuvant is present in the reaction mixture in a quantity representing 0.1% to 10% by weight of the bitumen.

4. The process according to claim 1, wherein the functionalized olefinic copolymers are chosen from:

(i) random terpolymers of ethylene, of alkyl acrylate or methacrylate containing a $C_1$–$C_6$ alkyl residue and of maleic anhydride, which contain, by weight, 0.5% to 40% of units derived from alkyl acrylate or methacrylate and 0.5% to 15% of units derived from maleic anhydride, the remainder being formed by units derived from ethylene;

(ii) random terpolymers of ethylene, of alkyl acrylate or methacrylate containing a $C_1$–C6 alkyl residue and of glycidyl acrylate or methacrylate, which contain, by weight, 0.5% to 40% of units derived from alkyl acrylate or methacrylate and 0.5% to 15% of units derived from glycidyl acrylate or methacrylate, the remainder being formed by units derived from ethylene; and (iii) maleic anhydride-grafted low density polyethylenes and maleic anhydride-grafted polypropylenes, which contain, by weight, 0.5% to 15% of grafted units derived from maleic anhydride.

5. Process for the preparation of bitumen/polymer compositions with improved mechanical properties, in which a bitumen or mixture of bitumens is brought into contact with, calculated on the weight of th e bitumen, between 0.3% and 20% of a sulphur-crosslinkable elastomer and a sulphur-donor coupling agent in a quantity capable of providing a quantity of free sulphur representing 0.1% to 20% of the weight of sulphur crosslinkable polymer in the reaction mixture containing the bitumen, elastomer and coupling agent, the operation being carried out at temperatures of between 100° C. and 230° C., with stirring, for a period of at least 10 minutes, the reaction mixture also containing, when the said contact is brought about, 0.05% to 15%, by weight of the bitumen, of a polymer adjuvant consisting of at least one functionalized olefinic polymer selected from the group consisting of:

(i) random copolymers of ethylene and of a monomer selected from the group consisting of glycidyl acrylate and glycidyl methacrylate, which contain, by weight, 80% to 99.7% of ethylene;

(ii) random terpolymers of ethylene, of a monomer A selected from the group consisting of vinyl acetate and alkyl acrylates or methacrylates containing a $C_1$ to $C_6$ alkyl residue and of a monomer B selected from the group consisting of glycidyl acrylate and glycidyl methacrylate, which contain, by weight, 0.5% to 40% of units derived from the monomer A and 0.5% to 15% of units derived from the monomer B, the remainder being formed by units derived from ethylene; and (iii) graft copolymers resulting from the grafting of a monomer B selected from the group consisting of glycidyl acrylate and glycidyl methacrylate, onto a substrate consisting of a polymer selected from the group consisting of polyethylenes, polypropylenes and a random copolymer of ethylene and of a monomer A, which contain, by weight, 40% to 99.7% of ethylene, said graft copolymers containing, by weight, 0.5% to 15% of grafted units originating from the monomer B.

6. The process according to claim 5 wherein the functionalized olefinic polymers are selected from the group consisting of random terpolymers of ethylene, of alkyl acrylate or methacrylate and 0.5% to 15% of units derived from glycidyl acrylate or methacrylate, the remainder being formed by units derived from ethylene.

7. The process according to claim 1, wherein the polymer adjuvant is formed by associating a functionalized olefinic copolymer comprising units containing —COOH functional groups and a functionalized olefinic copolymer comprising units containing glycidyl functional groups.

8. The process according to claim 1, wherein the olefinic copolymers employed for forming the polymer adjuvant have a melt index, determined according to ASTM Standard D 1238, which has a value, expressed in g per 10 minutes, of between 0.3 and 3000.

9. The process according to claim 1, wherein the bitumen or the mixture of bitumens is chosen from bitumens which have a kinematic viscosity of 100° C. of between $0.5 \times 10^{-4} m^2/s$ and $3 \times 10^{-2} m^2/s$.

10. The process according to claim 9, wherein the bitumen or mixture of bitumens has a penetrability at 25° C., defined according to NF Standard T 66004, of between 5 and 800.

11. The process according to claim 1, wherein the quantity of sulphur-crosslinkable elastomer represents 0.5% to 10% of the weight of the bitumen.

12. The process according to claim 1, wherein the sulphur-crosslinkable elastomer is chosen from random or block copolymers of styrene and of a conjugated diene.

13. The process according to claim 12, wherein the copolymer of styrene and of conjugated diene contains, by weight, 5 to 50 of styrene.

14. The process according to claim 17, wherein the weight-average molecular weight of the copolymer of styrene and of conjugated diene is between 10,000 and 600,000 daltons.

15. The process according to claim 1, wherein the sulphur-donor coupling agent is selected from the group consisting of elemental sulphur, hydrocarbyl polysulphides, sulphur-donor vulcanization accelerators, mixtures of such products with each other and mixtures of at least one of these products with at least one vulcanization accelerator which is not a sulphur-donor.

16. The process according to claim 1, wherein the reaction mixture giving rise to the bitumen/polymer compositions is formed by producing a mixture containing the bitumen or mixture of bitumens and the sulphur-crosslinkable elastomer and then by incorporating the coupling agent and the polymer adjuvant into this mixture.

17. The process according to claim 1, wherein the reaction mixture giving rise to the bitumen/polymer compositions is formed by producing a mixture containing the bitumen or mixture of bitumens, the sulphur-crosslinkable elastomer and the polymer adjuvant and then incorporating the sulphur-donor coupling agent into the resulting mixture obtained.

18. The process according to claim 17, wherein the sulphur-crosslinkable elastomer and the polymer adjuvant are brought into contact with the bitumen or mixture of bitumens, the operation being carried out at temperatures of between 100° C. and 230° C. for a period of at least 10 minutes to form a reaction product comprising the bitumen/polymer composition.

19. The process according to claim 18, wherein the polymer adjuvant is incorporated into the bitumen or mixture of bitumens before or after the sulphur-crosslinkable elastomer.

20. The process according to claim 1, wherein the reaction mixture giving rise to the bitumen/polymer compositions, contains at least one additive capable of reacting with the functional groups of the copolymer or of the copolymers comprising the polymer adjuvant.

21. The process according to claim 20, wherein the quantity of the at least one reactive additive which is incorporated into the reaction mixture giving rise to the bitumen/polymer compositions represents 0.01% to 10% of the weight of the bitumen.

22. The process according to claim 1, wherein from 1% to 40% by weight of a fluxing agent, based on the weight of the bitumen or mixture of bitumens, is added to the bitumen/polymer composition at any time of its constitution.

23. The process according to claim 22, wherein the fluxing agent consists of a hydrocarbon oil which has an atmospheric pressure distillation range, determined according to ASTM Standard D 86-67, of between 100° C. and 600° C.

24. The process according to claim 23, wherein the sulphur-crosslinkable elastomer, the polymer adjuvant and the coupling agent are incorporated into the bitumen or mixture of bitumens in the form of a mother solution of these products in the hydrocarbon oil constituting the fluxing agent.

25. The process according to claim 24, wherein the mother solution contains, calculated on the weight of the hydrocarbon oil, 5% to 30% of sulphur-crosslinkable elastomer, 1% to 20% of polymer adjuvant and 0.005% to 6% of coupling agent.

26. The process according to claim 24, wherein the mother solution is mixed with the bitumen or mixture of bitumens, the operation being carried out at temperatures of between 100° C. and 230° C. with stirring and the resulting mixture is stirred at temperatures of between 100° C. and 230° C. for a period of at least 10 minutes to form a reaction product comprising the bitumen/polymer composition.

27. The process according to claim 8, wherein the olefinic copolymers have a melt index between 0.5 and 900.

28. The process according to claim 9, wherein the bitumens have a kinematic viscosity at 100° C. of between $1 \times 10^{-4} m^2/s$ and $2 \times 10^{-2} m^2/s$.

29. The process according to claim 10, wherein the bitumen or mixture of bitumens has a penetrability at 25° C. of between 10 and 400.

30. The process according to claim 12, wherein the conjugated diene is selected from the group consisting of butadiene, isoprene, chloroprene, carboxylated butadiene and carboxylated isoprene.

31. The process according to claim 14, wherein the weight-average molecular weight is between 30,000 and 400,000 daltons.

32. The process according to claim 21, wherein the quantity of the at least one reactive additive represents 0.05% to 5% of the weight of the bitumen.

33. The process according to claim 23, wherein the atmospheric pressure distillation range is between 150° C. and 400° C.

34. The process according to claim 20, wherein said at least one additive is selected from the group consisting of primary amines, secondary amines, polyamines, alcohols, polyols, acids, polyacids and metal compounds.

* * * * *

UNITED STATES PATENT AND TRADEMARK OFFICE
CERTIFICATE OF CORRECTION

PATENT NO. : 6,011,094
DATED : January 4, 2000
INVENTOR(S) : Jean Pascal, et. al.

It is certified that error appears in the above-identified patent and that said Letters Patent is hereby corrected as shown below:

Column 3, line 43: the expression "$y + z \leq 0.3$ should be --$y + z \geq 0.3$--;

line 67: "$C_1-C_6$" should read --$C_1-C_{10}$--

Column 4, line 1: "$C_1-C_{10}$" should read --$C_1-C_6$--;

line 5: in the second formula, a double bond should connect "$CH_2$" to "C"

line 49: "$S_2$" should read --$SO_2$--

Column 6, line 56: the symbol "R" should read --$R_9$--

Column 12, line 3: "Theological" should be --rheological--

Column 14, line 2: "Theological should be --rheological-- line 42: "ab" and "eb" should respectively read --$\sigma_b$-- and --$\varepsilon_b$--

Claim 14: should be made dependent on Claim 12.

Signed and Sealed this

Sixth Day of February, 2001

Attest:

Q. TODD DICKINSON

*Attesting Officer*      *Director of Patents and Trademarks*

UNITED STATES PATENT AND TRADEMARK OFFICE
CERTIFICATE OF CORRECTION

PATENT NO. : 6,011,094
DATED : January 4, 2000
INVENTOR(S) : Jean Pascal Planche and Claude Lacour It is certified that error appears in the above-identified patent and that said Letters Patent is hereby corrected as shown below:

Title Page:
The Assignee's should read --Elf Aquitaine--.

Signed and Sealed this

Twenty-first Day of August, 2001

Attest:

*Attesting Officer*

NICHOLAS P. GODICI
*Acting Director of the United States Patent and Trademark Office*